United States Patent Office 3,106,095
Patented Oct. 8, 1963

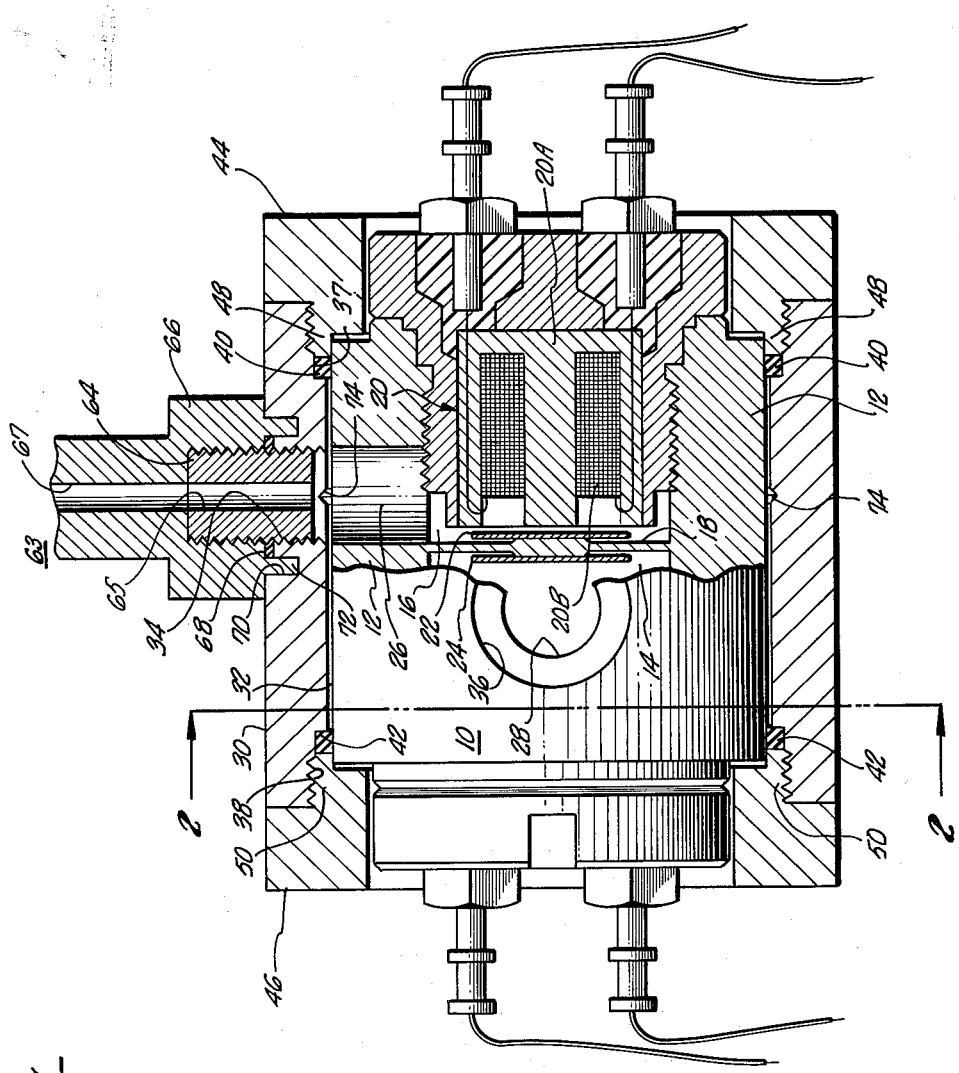

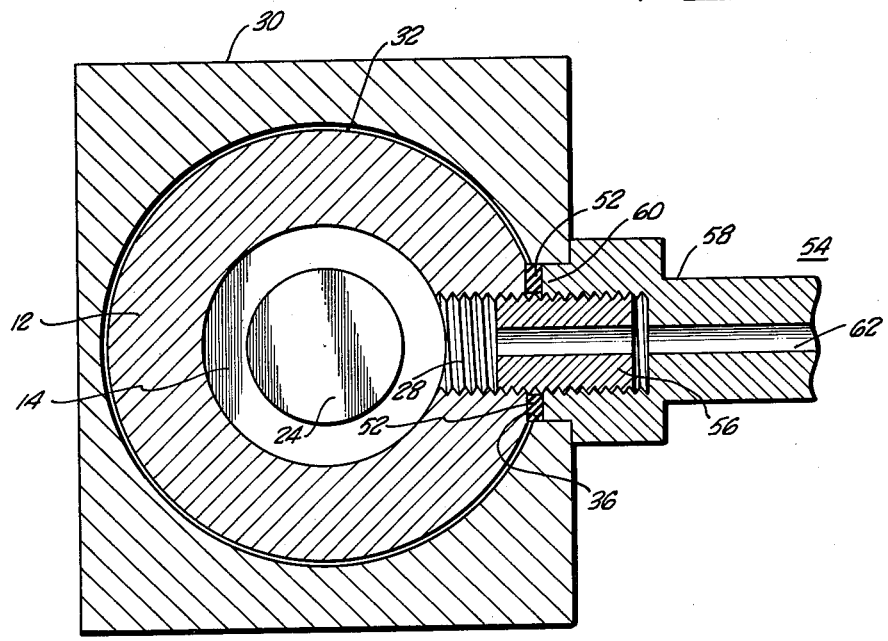
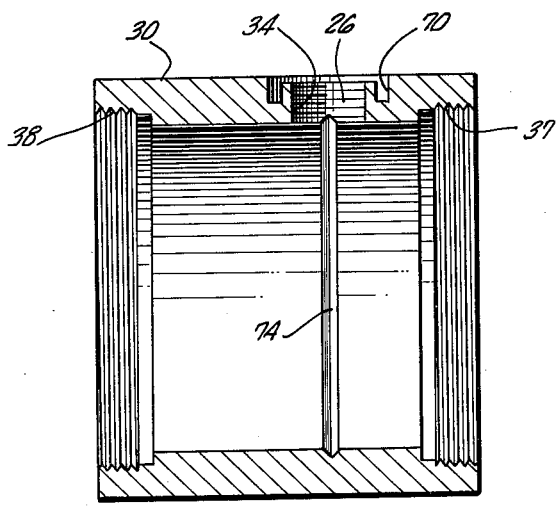

3,106,095
PRESSURE ADAPTER FOR PRESSURE
TRANSDUCERS
John R. Tavis, Sierra Madre, Calif., assignor to Edcliff
Instruments, Monrovia, Calif., a corporation of California
Filed June 7, 1961, Ser. No. 115,533
7 Claims. (Cl. 73—407)

This invention relates to apparatus for minimizing the effects of high line pressure on differential type pressure transducers.

It is often desired to measure small differences in the pressure of a fluid when the fluid is maintained at a high pressure. An example of this is the measurement of the pressure drop across a Venturi tube. For example, the pressure at one side of the Venturi tube may be of the order of 6,000 p.s.i. while the pressure at the other side is of the order of 5,995 p.s.i. To measure such a difference in pressure, a differential type pressure transducer may be utilized. Generally, this type of transducer includes a pressure-sensitive member coupled to a casing of the transducer and means for exposing opposite sides of the member to the fluid at different pressures. The deflection of the pressure-sensitive member is then utilized to provide a direct measure of the difference in the pressures at opposite sides of the member.

In providing this measurement, however, it is to be noted that the interior of the casing of the transducer to which the member is coupled is subjected to the high fluid pressure. This causes the casing to tend to expand and slightly stretch the pressure-sensitive member. Due to the stretching of the member, the spring constant of the member is changed thereby decreasing the sensitivity of the member to pressure differences and introducing inaccuracies into the differential pressure measurement.

Making the case stronger introduces other problems of size, weight, and material, and while it may reduce the stretching of the member to some extent, it does not eliminate it. In fact, since even one or two micro-inches of stretching of the member makes a measurable change in the spring constant of the member, this approach is not satisfactory.

In view of the above, the present invention provides apparatus for minimizing the effects of high line pressure on the casing of a pressure transducer, thus substantially eliminating the undesired stretching of the pressure-sensitive member.

Briefly, to accomplish this, the present invention provides a pressure chamber about the exterior of the transducer casing, and means for introducing fluid under pressure to said chamber. For this purpose, a sleeve arrangement may be fitted over the transducer casing, and communicating passages provided for introducing the fluid at line pressure to the outside of the casing as well as to the inside.

More particularly, the present invention in a basic form is particularly adapted for use with a pressure transducer having a casing, the interior of which is divided into two chambers by the pressure-sensitive member. The sleeve of the present invention is fitted over the casing, and means are provided for sealing the ends of the sleeve in an air-tight seal. The inner dimensions of the sleeve are slightly larger than the outer dimensions of the casing, so that a gap is created between the sleeve and the casing. Means are provided for applying the fluid at one pressure to one of the chambers and to the gap, and means are provided for applying the fluid at a different pressure directly to the other chamber.

In a preferred form, the casing has first and second ports for introducing fluid at different pressures into the two chambers. The sleeve has two holes which communicate with the two ports in the casing. Means are imposed between one of the holes in the sleeve and a port adjacent thereto for sealing the casing to the sleeve around the hole such that fluid injected into the hole passes directly into its associated chamber. The other hole, on the other hand, is left unsealed. Accordingly, fluid injected under pressure into this hole passes into the gap as well as into the associated chamber.

Thus, the pressure inside as well as outside of the pressure transducer is maintained substantially at the large line pressure. This prevents the casing from expanding and in turn eliminates the undesired stretching of the pressure-sensitive member.

The above as well as other features of the apparatus of the present invention may be more clearly understood by reference to the following detailed description when considered with the drawings, in which:

FIGURE 1 is a schematic cross-sectional representation of a differential pressure type transducer incorporating a sleeve, according to the invention;

FIGURE 2 is a sectional view taken along line 2—2 of FIG. 1; and

FIGURE 3 is a schematic cross-sectional representation of the sleeve shown in FIG. 1.

A differential pressure transducer is represented at 10 in FIGURE 1. Specifically, the pressure transducer 10 is of a type described in detail in co-pending patent application Serial No. 811,726, filed May 7, 1959, and assigned to the same assignee as the present invention. As shown, the transducer 10 includes a casing 12 which is divided into two chambers or compartments 14 and 16 by a pressure-sensitive diaphragm member 18. The transducer 10 includes an electromagnet arrangement shown typically at 20 disposed in each of the compartments 14 and 16. Each electromagnet has an open ended core 20A and a winding 20B. Current passing through the winding of each electromagnet generates a magnetic field having a flux path the reluctance of which is varied by movement of a pair of magnetic plates 22 and 24 which are bonded to the diaphragm 18 opposite the electromagnet cores. The variation in the reluctance of the flux path produced by the movement of the diaphragm responsive to pressure provides a measure of the relative pressures in the two compartments 14 and 16.

For admitting fluids, the transducer 10 includes two ports 26 and 28 which pass through the casing 12 into the compartments 16 and 14, respectively.

When fluids at high pressures are injected into the compartments 14 and 16, the diaphragm 18 is not only subjected to a lateral displacement responsive to pressure difference between the compartments but also to a longitudinal stress due to the pressure within each of the compartments 14 and 16 acting upon the inner walls of the casing 12. Specifically, the high pressure of the fluids tends to cause the casing 12 to expand which, in turn, exerts a stretching force on the diaphragm 18 changing its spring constant. Unless this problem is eliminated, the transducer must be re-calibrated for each gauge pressure level at which it operates to measure pressure differentials to avoid the attendant errors in detecting differential pressures.

To eliminate the undesired stretching of the diaphragm 18, the present invention includes means for introducing a fluid under high pressure to the outside of the casing 12 as well as to the inside. To accomplish this, a sleeve 30 of high strength material surrounds the casing 12. As represented, the inner dimensions of the sleeve 30 are slightly larger than the outer dimensions of the casing 12, whereby a gap 32 is formed between the inner surface of the sleeve 30 and the outer surface of the casing 12. More particularly, it is the gap 32 into which the fluid at high pressure is injected to maintain a high pressure on the outside of the casing 12, the gap acting as an exterior pressure chamber.

To provide means for injecting fluid under pressure through the sleeve 30 into the compartments 14 and 16, the sleeve 30 includes a threaded hole 34 and a hole 36 which are aligned to communicate with the ports 26 and 28, respectively.

To complete the enclosure of the casing in accordance with the present invention, means are provided for sealing the ends of the sleeve 30 in an airtight seal. More particularly, to provide the desired airtight seal, the ends of the sleeve 30 include threaded interior annular recesses 37 and 38, respectively. Included within the annular recesses 37 and 38 are Teflon O-rings represented at 40 and 42, respectively. As shown, the O-rings are seated within the annular recesses and make contact with the outer surface of the casing 12 and the inner surface of the sleeve 30. To provide means for compressing the O-rings 40 and 42 to create the desired airtight seal between the casing 12 and the sleeve 30, caps 44 and 46 are included. As represented, the caps 44 and 46 include exteriorly threaded annular flanges 48 and 50, respectively. The annular flange 48 screws within the annular recess 37 to make contact with the O-ring 40; in a like manner the annular flange 50 screws within the recess 38 and makes contact with the O-ring 42. This compresses the O-rings 40 and 42, thereby creating the desired airtight seal between the sleeve 30 and the casing 12 at the ends of the sleeve 30. Also, this mounts the sleeve to the casing.

To provide means for injecting a fluid at high pressure directly into the chamber or compartment 14, the present invention as best illustrated in FIGURE 2 includes a ring-shaped Teflon gasket 52 disposed on the surface of the casing 12 around the port 28. The gasket 52 is compressed to create an airtight seal between the sleeve 30 and the casing 12 by means of a coupling arrangement indicated generally at 54. More particularly, the coupling arrangement 54 includes an externally threaded bolt 56 having a bore therethrough for communicating with the port 28. The bolt 56 screws into the threaded port 28, with a portion thereof remaining as an extension beyond the outer surface of the casing 12. Further, the coupling arrangement 54 includes a fitting 58 having an internally threaded bore mated with the externally threaded extension of the bolt 56 and having a flanged portion 60 which seats within the hole 36 and against the gasket 52. The fitting 58 has a bore 62 which communicates through the bore of the bolt 56 with the threaded port 28. Accordingly, fluid under pressure is passed directly through the bore 62, the bolt 56, and the port 28 to the compartment 14. Due to the airtight gasket 52, this fluid is prevented from leaking around the bolt 56 to the gap 32.

To provide means for injecting fluid into the compartment 16 as well as around the casing 10 within the gap 32, the present invention includes a coupling arrangement represented generally at 63 in FIGURE 1, which maintains an opening between the sleeve 30 and the casing 12. In particular, the coupling arrangement 63 includes an externally threaded bolt 64 which screws into threaded hole 34 for a short distance, leaving part thereof protruding beyond the sleeve. Further, the coupling arrangement includes a fitting 66 having an internally threaded bore mated to the protruding part of externally threaded bolt 64. The bolt 64 and the fitting 66 have aligned common passages 65, 67 respectively which communicate with the gap 32 and port 26. To prevent leakage of the fluid applied through the fitting 66 to the outer surface of the sleeve 30, a ring-shaped Teflon gasket 68 is imposed on the outer surface of the sleeve 30 around the bolt 64. An annular recess, indicated at 70, is included in the surface of the sleeve 30 around the hole 34. The fitting 66 includes an annular flange, indicated at 72, which fits into the annular recess 70. By tightening the fitting 66, the gasket 68 is compressed to create the desired airtight seal between the bolt 64 and the fitting 66 at the outer surface of the sleeve 30.

Accordingly, fluid under pressure injected through the fitting 66 and the bolt 64 passes into the gap 32 as well as into the compartment 16.

To speed the flow of fluid into the gap 32 and thereby improve frequency response, and to remove any requirement for alignment between hole 34 and port 26, the sleeve of the present invention includes an annular groove 74 in its inner surface which passes through the hole 34.

I claim:

1. A differential pressure transducer comprising a casing having two internal pressure chambers for receiving fluid under different pressures, a pressure-sensitive member disposed within and coupled to the casing and dividing the two internal pressure chambers one from the other, means defining an additional pressure chamber about the exterior of the casing, means for applying fluid under one pressure to one of the interior chambers and to the chamber about the exterior of the casing, and means for applying fluid under a different pressure to the other interior chamber.

2. In a differential pressure transducer including a casing having two internal pressure chambers for receiving fluid under different pressures and a pressure-sensitive member disposed within and coupled to the casing and dividing the two internal pressure chambers one from the other, the combination of a sleeve of high strength material disposed around the casing, the sleeve having inner dimensions which are larger than the casing to form a gap between the sleeve and the casing, means for sealing the ends of the sleeve, means for applying fluid under one pressure to one of the interior chambers and to the gap between the sleeve and the casing, and means for applying fluid under a different pressure to the other interior chamber.

3. In combination with a differential pressure transducer including a casing having two internal chambers each chamber having a port for receiving a fluid of variable pressure and a pressure-sensitive member disposed within and coupled to the casing and dividing the two internal chambers one from the other, a pressure adapter comprising: a sleeve of high strength material fitted around the casing of the pressure transducer, the inner dimensions of the sleeve being slightly larger than the casing to form a gap between the sleeve and the casing the sleeve having holes bored therein communicating with the ports in the casing; means for sealing the ends of the sleeve and means for creating an airtight seal between the sleeve and the casing around one of the holes such that a fluid passed through the one of the holes passes directly into one of the two internal chambers while a fluid applied through the other hole passes into the gap and into the other of the two chambers.

4. In a differential pressure transducer which includes a casing divided into two internal chambers by a pressure-sensitive member, each chamber having a port for receiving a fluid of variable pressure the combination of: a sleeve of high strength material fitted around the casing of the pressure transducer, the inner dimensions of the sleeve being slightly larger than the casing to produce a gap between the casing and the sleeve, the sleeve having two holes bored therethrough communicating with the two ports in the casing of the transducer; gasket means for creating an airtight seal between the sleeve and the casing around one of the two holes; means for sealing the ends of the sleeve; means sealed to the outer surface of the sleeve around the one of the two holes for applying fluid under one pressure through the one of the two holes to one of the internal chambers and to the gap between the sleeve and the casing; and means for applying the fluid under a different pressure through the other one of the two holes to the other internal chamber.

5. In combination with a differential pressure transducer which includes a casing having two internal chambers, two ports one passing through the casing into each chamber for receiving fluids of variable pressure, and a pressure-sensitive member disposed within and coupled to the casing and dividing the two internal chambers one from the other, a pressure adapter comprising: a sleeve of high strength material fitted over the casing and having two holes bored therethrough communicating with the two ports of the casing, the sleeve having inner dimensions which are slightly larger than the casing to form a gap between the casing and the sleeve, and having an annular groove in its inner surface passing through a one of said two holes; gasket means for creating an airtight seal between the sleeve and the casing around the other one of the two holes; means for sealing the ends of said sleeve; and means sealed to the outer surface of said sleeve around the one of the two holes for receiving fluid under pressure.

6. In combination with a pressure transducer which includes a casing divided into two internal chambers by a pressure-sensitive member coupled to the casing, each chamber including a threaded port for receiving a fluid of variable pressure, a pressure adapter comprising: a sleeve of high strength material fitted around the casing of the pressure transducer, the inner dimensions of the sleeve being slightly larger than the casing to form a gap between the casing and the sleeve, the sleeve having two holes bored therein communicating with the two ports of the pressure casing of the transducer, a one of the holes being threaded; a first externally threaded bolt screwed into the threaded hole and having a bore therethrough for receiving a fluid under one pressure; a first gasket positioned on the outer surface of the sleeve around the first bolt; means for compressing the first gasket to create an airtight seal between the outer surface of the sleeve and the first bolt; a second externally threaded bolt disposed within the other hole and screwed into a threaded port of the pressure transducer, the second bolt having a bore therethrough for receiving a fluid under a different pressure; a second gasket disposed on the surface of the casing around the second bolt; means for compressing the second gasket to create an airtight seal between the casing and the sleeve around the second bolt; and means for sealing the ends of the sleeve.

7. In a pressure transducer, the combination of: means forming a first chamber having an inner wall, and adapted to receive a pressure sensitive member; a deflectible pressure sensitive member mounted within and coupled to the inner wall of the first chamber; means forming a second pressure chamber surrounding the first chamber; means for introducing fluid under pressure into the first chamber; and means for introducing a fluid under pressure into the second chamber around the first chamber.

References Cited in the file of this patent

UNITED STATES PATENTS

| | | |
|---|---|---|
| 1,173,038 | Roschanek | Feb. 22, 1916 |
| 1,700,449 | Reilly | Jan. 29, 1929 |
| 2,063,582 | Kollsman | Apr. 7, 1936 |

FOREIGN PATENTS

| | | |
|---|---|---|
| 16,621 | Great Britain | 1884 |